(12) United States Patent
Adams et al.

(10) Patent No.: US 8,171,953 B2
(45) Date of Patent: May 8, 2012

(54) TANK PRESSURE AND VACUUM RELIEF DEVICE

(75) Inventors: David J. Adams, Warren, PA (US);
Patrick J. Lund, Jamestown, NY (US);
Craig E. Culbertson, Warren, PA (US)

(73) Assignee: Betts Industries, Inc., Warren, PA (US)

( * ) Notice: Subject to any disclaimer, the term of this patent is extended or adjusted under 35 U.S.C. 154(b) by 405 days.

(21) Appl. No.: 12/471,125

(22) Filed: May 22, 2009

(65) Prior Publication Data

US 2009/0288719 A1 Nov. 26, 2009

Related U.S. Application Data

(60) Provisional application No. 61/055,338, filed on May 22, 2008.

(51) Int. Cl.
*F16K 17/26* (2006.01)
*F16K 24/00* (2006.01)

(52) U.S. Cl. ................................ 137/493.6; 137/493.9

(58) Field of Classification Search ............... 137/493.9, 137/493.3, 493.4, 493.5, 493.6, 493.8, 583, 137/585, 588
See application file for complete search history.

(56) References Cited

U.S. PATENT DOCUMENTS

| | | | |
|---|---|---|---|
| 1,498,358 A | 6/1924 | DeKrafft | |
| 1,560,272 A | 11/1925 | McAusland | |
| 2,349,137 A | 5/1944 | Brown | |
| 3,939,866 A | 2/1976 | Pignatelli | |
| 4,287,910 A | 9/1981 | Petersen | |
| 4,593,711 A * | 6/1986 | Morris | 137/39 |
| 5,165,445 A * | 11/1992 | Vertanen | 137/493.6 |
| 5,240,027 A * | 8/1993 | Vertanen | 137/73 |
| 5,479,978 A * | 1/1996 | Zenkich | 137/493.3 |
| 5,666,989 A * | 9/1997 | Roetker | 137/43 |
| 5,673,897 A * | 10/1997 | Crochet et al. | 251/63.6 |
| 5,967,358 A * | 10/1999 | Adams et al. | 220/203.09 |

* cited by examiner

*Primary Examiner* — Stephen M Hepperle
*Assistant Examiner* — Seth Faulb
(74) *Attorney, Agent, or Firm* — Hahn Loeser & Parks LLP; Bret A. Hrivnak, Esq.

(57) ABSTRACT

Particular embodiments of the present invention include devices and methods for relieving excess pressure or vacuum pressure from a tank interior. An embodiment of a pressure relief device includes a housing having an opening associated with a first end, an opening associated with a second end, and an over-pressure opening. The device further including a pressure relief valve for selectively relieving pressure from a tank, the valve including an over-pressure opening seal biased by a first pressure bias means against a pressure valve seat associated with the over-pressure opening. The device also including a guide block translatable in an axial direction of a second bore of the housing and being biased toward the pressure valve seat by a second pressure bias means. The guide block is translatable independent of the over-pressure opening seal. The device also includes a vacuum relief valve for selectively relieving vacuum pressure in the tank.

21 Claims, 8 Drawing Sheets

TANK PRESSURE AND VACUUM RELIEF DEVICE

This Application claims the benefit of U.S. provisional patent application Ser. No. 61/055,338, filed May 22, 2008, which is hereby incorporated by reference.

TECHNICAL FIELD

The invention relates generally to a relief valve for tanker trucks. More particularly, the invention relates to a relief valve for fuel tanker trucks for relieving excessive pressure or vacuum within the interior of the tank. Even more particularly, the invention relates to a relief valve device for fuel tanker trucks that relieves excessive pressure or vacuum within the interior of the tank while withstanding vibrations that occur during operation of the trucks.

BACKGROUND OF THE INVENTION

Fueling tanker trucks are typically constructed as an elongated, horizontal tank having a number of internally divided compartments with various unequal volume capacities to store and transport gasoline, fuel oil, aircraft fuels, or other volatile liquids and fuels. Gasoline tankers are typically bottom loaded through load only or load/unload couplers located below the tanker undercarriage. Vapor rails, channels, or trunks extending along the outside top of the tank include pressure valves tending to generally equalize the vapor pressure at the top of each compartment.

Normally one or more tanker compartments are provided with a large manhole or hatch at the top of the tank. The manhole is covered by a hinged hatch cover which must be sealed liquid tight when closed. Gaskets and other devices are provided for this purpose. One or more of the hatch covers or the upper tank wall itself mounts a vapor pressure relief valve or vent valve operable to allow the escape of vapors from the top of a tank compartment to the atmosphere when excessive pressure builds above a predetermined pressure, such as, for example, 1.0 psi or, any other pressure design parameter. The vent valve also enables the intake of air to relieve predetermined excessive vacuum or negative pressure at the tank top, such as, for example, minus 6 ounces psi. These positive and negative pressure conditions normally appear during loading, unloading, a rise in tank temperature or a decline in tank temperature.

There is a need for a simple unitary relief valve mechanism that efficiently relieves excessive pressure or vacuum in a transportation tank or the like. There are many stringent requirements for such a valve. It must contain a number of fail-safe features. In the event of tank roll-over at any angle, for example, the valve must prevent excessive loss of lading. On either excessive pressure or vacuum, the action of the valve must be quick and positive.

Current valves are tested in static conditions. However, it is known that during transport, a transportation tank is subjected to vibrations as the truck travels over rough road conditions such as bumps or potholes. When the transportation tank does vibrate, it is common for the valve to release vapors below the static pressure of the valve.

Notwithstanding the state of the art as described herein, there is a need for further improvements in tank pressure and vacuum relief valves for fuel tanker trucks that can withstand tank vibrations so as to prevent the release of vapors below the static pressure of the valves.

SUMMARY OF THE INVENTION

Particular embodiments of the present invention include devices and methods for relieving excess pressure or vacuum pressure from a tank interior, and for preventing fluid leakage when the device or tank is tipped or inverted. Particular embodiments of the device for relieving excess pressure or vacuum pressure from a tank interior include a housing having a first bore in communication with a second bore. The first bore extends from a first end of the housing and the second bore extends from a second end of the housing. The first end is securable to a tank wall for communication with an aperture in the wall. The second end is adapted for selective communication with the tank interior. The housing also includes an over-pressure opening in communication with the second bore opposite the second end. In particular embodiments, the device also includes a pressure relief valve for selectively relieving pressure from a tank. The pressure relief valve includes a valve sealing member biased by a first pressure bias means against a pressure valve seat associated with the over-pressure opening. In particular embodiments, the device further includes a guide block translatable in an axial direction of the second bore and being biased toward the pressure valve seat by a second pressure bias means, the guide block being translatable independent of the over-pressure opening seal. Particular embodiments of the device may also include a vacuum relief valve for selectively relieving vacuum pressure in the tank, the vacuum relief valve including a vacuum seal biased against a vacuum valve seat associated with the housing second end, the vacuum seal being biased by a third pressure bias means.

Particular embodiments of the method for selectively relieving excess pressure or vacuum pressure from a tank include the step of providing a tank pressure and vacuum relief device. In particular embodiments, the device includes: a housing having a first bore extending from a first end of the housing and a second bore extending from a second end of the housing, the first bore being in communication with the second bore and being securable to a tank wall for communication with an aperture in the wall, the second end being adapted for selective communication with the tank interior, and the housing also having an over-pressure opening in communication with the second bore opposite the second end; a pressure relief valve including a valve sealing member biased against a pressure valve seat associated with the over-pressure opening by a first pressure bias means, the seal being capable of sealing the over-pressure opening; a guide block translatable in an axial direction of the second bore and being biased toward the pressure valve seat by a second pressure bias means and capable of applying pressure to the pressure valve seal; and, a vacuum relief valve for selectively relieving vacuum pressure in the tank, the vacuum relief valve including a vacuum seal biased against a vacuum valve seat associated with the housing second end, the vacuum seal being biased by a third pressure bias means. Particular embodiment of the method may further include the steps of placing the device within a tank and affixing the first end of the housing to an aperture in a wall of the tank, and relieving excess pressure within the tank acting against the over-pressure valve by compressing the first and second valve bias means so to release the over-pressure valve seal from engagement with the over-pressure valve seat associated with the over-pressure opening in said housing, the excess pressure flowing into the housing through the over-pressure opening and through the second bore to the first bore of the housing to the first end, where said excess pressure is expelled from housing through the first end opening. Particular embodiments of the method may further include relieving vacuum pressure within the tank acting against the vacuum pressure valve by compressing the third valve bias means so to release the vacuum pressure seal from the vacuum pressure seat associated with the second end of said housing and allow pressurized fluid to selectively enter the tank through the second end of housing, where such pressurized fluid is first received by the first end of said housing before being expelled into the tank through the second end.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF A PREFERRED EMBODIMENT

Figure 1A:
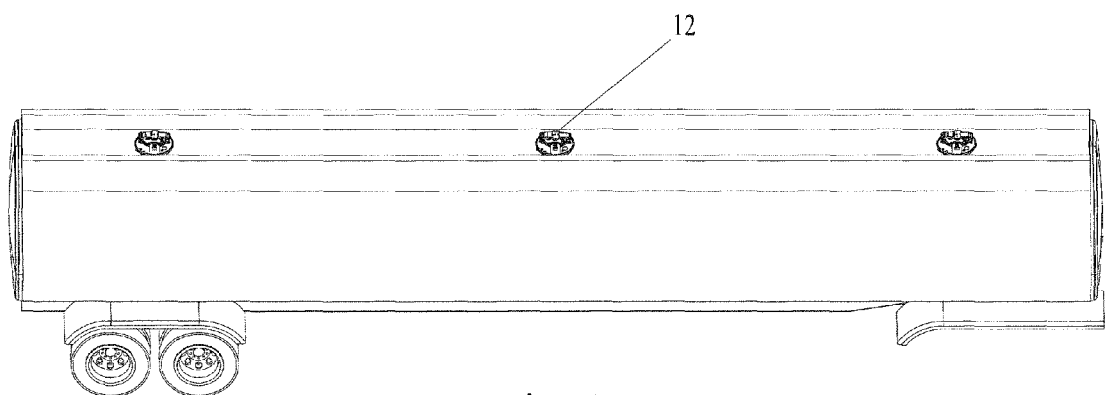
FIG. 1A is an overhead pictorial view of a typical tanker truck with a manhole cover covering a pressure and vacuum relief valve device of the invention.
Figure 1B:
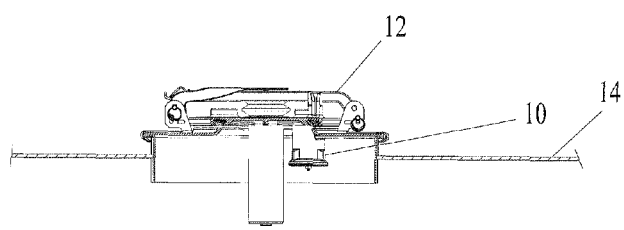
FIG. 1B is a partial cross-sectional view of a typical tanker truck with a manhole cover covering a pressure and vacuum relief valve device of the invention.

In one embodiment, as seen in FIGS. 1A and 1B, a pressure and vacuum relief valve device 10 is releasably engaged in a tank wall aperture in manhole cover 12, which is secured in the top wall 14 of a fuel tank of a truck. Although the valve 10 is shown as being secured in the manhole cover of a fuel tank, it will be understood that valve may be positioned in the top or upper portion of any type of tank designed for carrying fluids, in a manhole cover or elsewhere.

Figure 2:
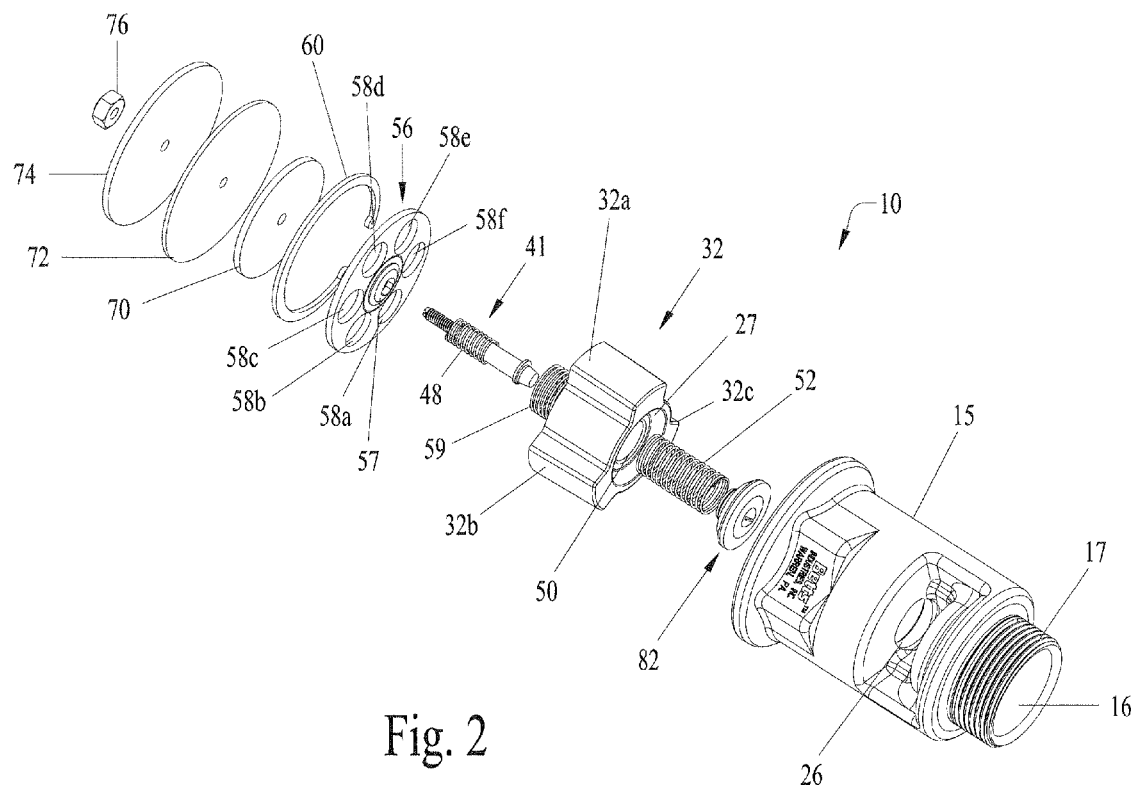
FIG. 2 is a first exploded view of the pressure and vacuum relief valve shown in FIG. 1B and showing the parts thereof in position prior to assembly.
Figure 3:
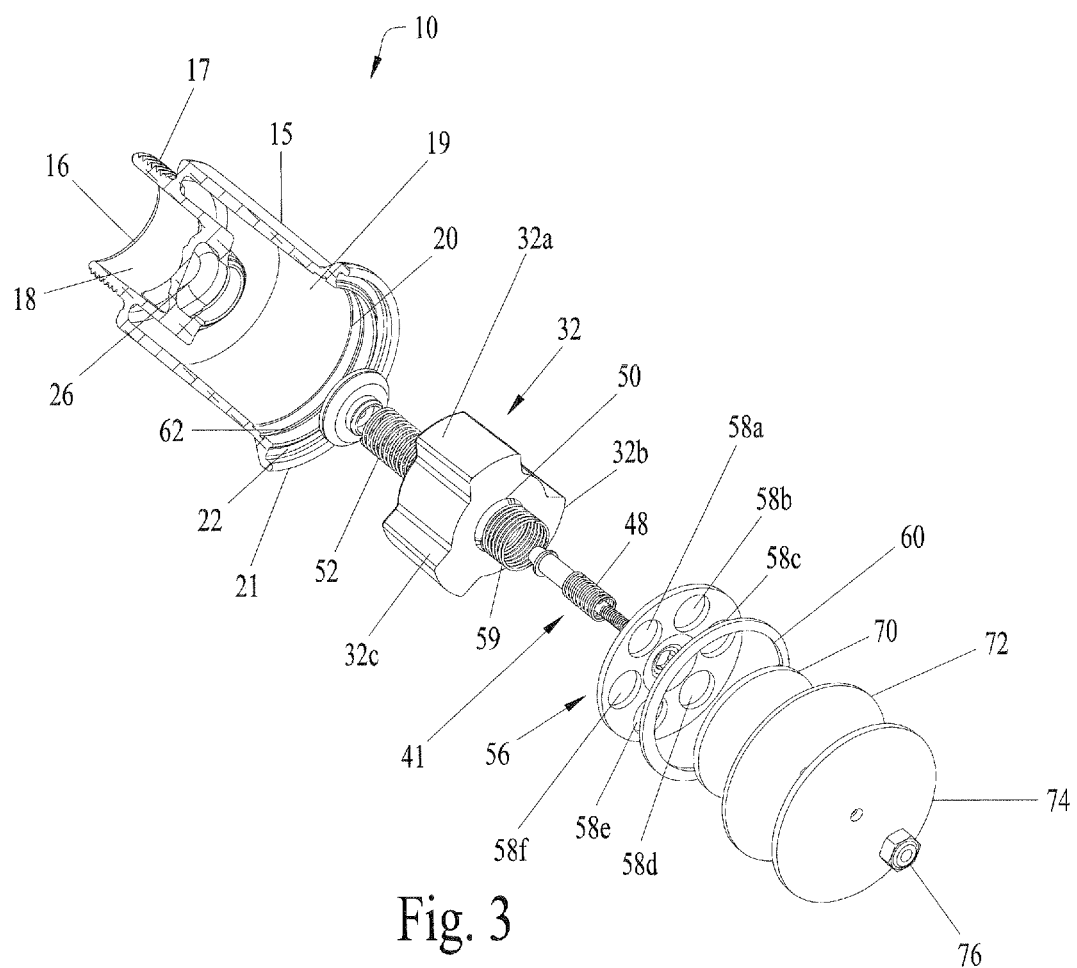
FIG. 3 is a second exploded view of the pressure and vacuum relief valve shown in FIG. 1B and showing the parts thereof in position prior to assembly.
Figure 4:
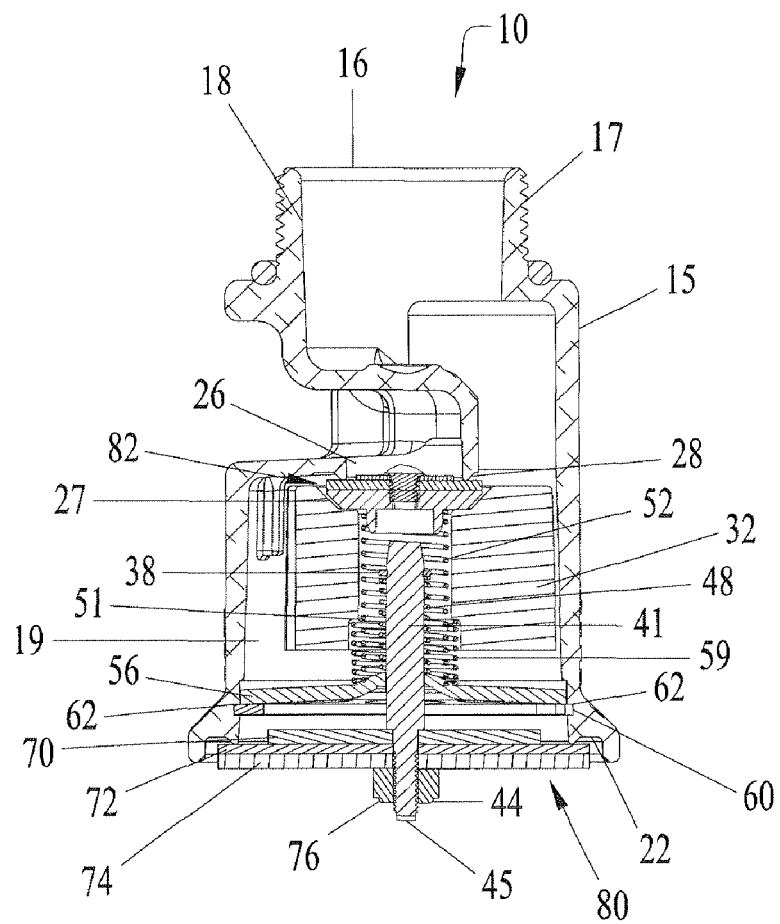
FIG. 4 is a cross-sectional view of the pressure and vacuum relief valve device of the invention in an assembled form.

In an embodiment illustrated in FIGS. 2-4, the pressure and vacuum relief valve device 10 includes an elongated housing 15 having an outer or first end 16. Extending exteriorly from outer end 16 is a threaded sleeve portion 17, such sleeve portion being threadedly and releasably secured in the tank wall aperture, thus positioning the device 10 in the tank interior. In other variations of device 10, any other means of attaching device 10 to a tank known to one of ordinary skill in the art may be employed or provided in lieu of threaded sleeve portion 17. Extending inwardly into housing 15 from first end 16 is a first bore (or passage) 18, which in operation communicates with the atmosphere exteriorly of the tank. The housing 15 has a second or main housing bore (or passage) 19 extending from first bore 18 and terminating at tank vacuum opening 20 of the second or inner end 21 of housing 15. In one embodiment, main bore 19 is substantially circular. In operation, vacuum opening 20 is in selective communication with the tank interior. A vacuum valve seat 22 is associated with vacuum opening 20 and second end 21 for the purpose of sealing opening 20. The housing 15 also includes a tank over-pressure opening 26, which may form a selectively restricted bore or opening having an end in communication with main housing bore 19. With reference to FIGS. 2-4, over-pressure opening 26 is positioned along an axial length of the housing between the first and second ends. In the embodiment shown, over-pressure opening 26 is accessed through an orifice extending from a side wall of housing 15, although other variations may exist. An over-pressure valve seat 28 is associated with the over-pressure opening 26 for the purposes of selectively sealing opening 26.

As shown in the embodiment of FIGS. 2, 3, 5 and 7, a guide block 32 is slidably positioned within main bore 19 for longitudinal (or axial) movement therein. Fluid passages 33a are provided between opposing ends of block 32. Such passages 33a may be formed entirely within block 32, such as by providing one or more bore, or may extend between block 32 and housing 15. For example, in the embodiments shown in the figures, device 10 includes a plurality of passages 33a formed within block 32 and between block 32 and housing 15, where such passages 33a are at least partially formed by recesses within block 32 between radially extending lobes (or extensions) 33. Each of the lobes 33 have associated outer surfaces or edges. In other variations any number of passages 33a and lobes 33 may be provided in association with block 32 and housing 15. For example, in the embodiment shown in the figures, guide block 32 has three (3) lobes 33, each of which have a corresponding outer surface or edge 32a, 32b and 32c. It is contemplated, however, that block 32 may not include any lobes, or may comprise one or more lobes each providing one or more outer surfaces. Further, block 32 and passages 33a may comprise any desired shape. For example, block 32 or passages 33a may have a circular or rectangular cross-section. Block 32 may also have a longitudinal (or axial) hole or bore 50 extending entirely through block 32 (i.e., between opposing longitudinal or axial ends of block 32), in which various pressure biasing members or springs extend, which will be discussed further below.

With reference to the embodiment shown, outer surfaces 32a, 32b and 32c of block 32 may contact the inner wall of bore 19 with a sliding fit such that block 32 is enabled to move longitudinally (or axially) within bore 19. It is also contemplated that edges 32a, 32b, and 32c may not contact the wall of bore 19, such that a gap is provided there between.

One function of guide block 32 is to provide an extra sealing force upon the over-pressure valve seat 28 in the event that a tank is tipped, such as when, for example, a tanker vehicle wrecks and the tank is tipped sideways or turned upside down. In such a case when device 10 is tipped sideways from it initial vertical orientation (i.e., when the axial direction of bore 19 is vertically aligned), block 32 remains positioned to prevent the unsealing of the over-pressure opening 26.

To selectively seal over-pressure opening 26, a pressure relief valve is provided, which includes a valve sealing member 81 for engaging an over-pressure valve seat 28 associated with over-pressure opening 26. In the embodiment shown in FIGS. 2-5, sealing member 81 includes a sealing pressure disc 34, screw 35, washer 36, and over-pressure seal 37.

Figure 9:
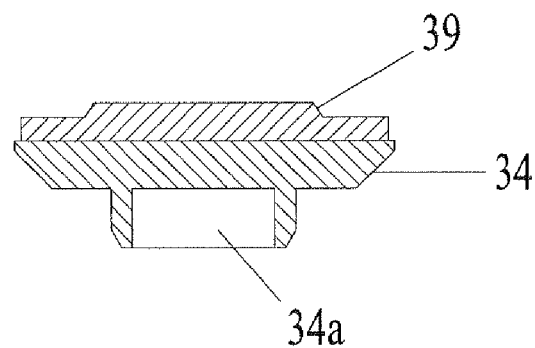
FIG. 9 is a cross-sectional view of another embodiment of the pressure disc assembly of the pressure and vacuum relief valve device of the invention.

Screw 35 and washer 36 releasably secure sealing pressure disc 34 and pressure seal 37 together, but sealing pressure disc 34 and pressure seal 37 are not fixed relative to block 32 by screw 35 and washer 36. In alternative embodiments, the pressure disc 34 and seal 37 may be attached by other means known to one of ordinary skill in the art, such as by adhesive or other fasteners, for example. Further, seal 37 may be positioned within a groove in disc 34. Still further, as shown for example in FIG. 9, valve sealing member 81 may form a single, over-molded pressure disc 39, as seen in FIG. 9, where seal 37 is molded about disc 39. Thus, this single, over-molded pressure disc 39 performs substantially the same function of the other separate pieces, but results in the reduction of machining additional parts as well as a reduction in assembly time.

Pressure relief valve sealing member 81 may be normally biased upward into a sealing engagement with pressure valve seat 28 by first pressure bias means 52. The first pressure bias means 52 may comprise at least one coiled spring, or any other means of forcefully biasing member 81. In particular variations, bias means 52 may comprise two or more springs in series to extend as desired. In the embodiment shown, first pressure bias means 52 acts independently of block 32, and compressively extends between the underside of the valve sealing member 81 and the top surface of perforated vacuum relief plate 56 through bore 50. Spring 52, which is compressed between underside of the pressure disc assembly and vacuum relief plate 56, functions to bias pressure valve sealing member 81 in a normally-closed position against pressure valve seat 28. Thus, block 32 can move freely, for example, as a result of vibrations, without affecting the sealing of over-pressure opening 26 because the valve sealing member 81 is not attached to block 32 and first pressure bias means 52 does not engage with block 32. Block 32 may include a recess (or valve sealing member seat) 27 for at least partially retaining or receiving valve sealing member 81.

A second pressure bias means 59, which may comprise a coiled spring as shown, is utilized to substantially control and maintain the position of block 32. In the embodiment shown in the figures, second pressure bias means 59 compressively extends between a shoulder 51 of the block 32, which extends radially outward within bore 50 of block 32, and the top surface of vacuum relief plate 56. In other variations, second pressure bias means 59 may engage other portions of block 32, such as, for example, an outer end of said block 32, as well as surfaces other than that of the relief plate 56. Second pressure bias means 59 may therefore be outwardly concentric relative to a lower portion of pressure relief spring 52. Second pressure bias means 59 normally urges the block 32 upward toward valve sealing member 81. Since block 32 and valve sealing member 81 are not fixedly attached to one another, valve sealing member 81 is able to remain sealingly engaged with opening seat 28 to seal over-pressure opening 26 when the tank experiences vibrations that cause block 32 to be deflected away from over-pressure opening 26 and valve sealing member 81. Still, when a tank is tipped, block 32 is able to remain positioned against valve sealing member 81 to assist in resisting the increased pressure acting against valve sealing member 81 by virtue of the increased head pressure provided by the fluid contained within the tank (since the valve is now located below the top surface of the contained fluid).

In an effort to maintain the seal of opening 26 and resist the head pressure when the tank is in a tipped position, second pressure bias means 59 maintains block 32 in close association and/or in contact with valve sealing member 81 when sealing member 81 is in a normally closed position. This ensures that when the tank is tipped, block 32 is able to assist sealing member 81 and first pressure bias means 52 to resist the head pressure attempting to unseal opening 26. Accordingly, in particular embodiments, to maintain block 32 in a vertical position in at least close association with sealing member 81, second pressure bias means 59 exerts a force against block 32 that is at least substantially equal to the weight of block 32. Further, in particular embodiments, to resist the head pressure contained within the tank when the tank is tipped or fully inverted (i.e., oriented upside-down), the sum of the weight of block 32, the weight of the sealing member 81, and the forces exerted by the first and second pressure bias means 52, 59 should be at least substantially equal to the expected head pressure of the fluid contained within the tank.

Figure 11:
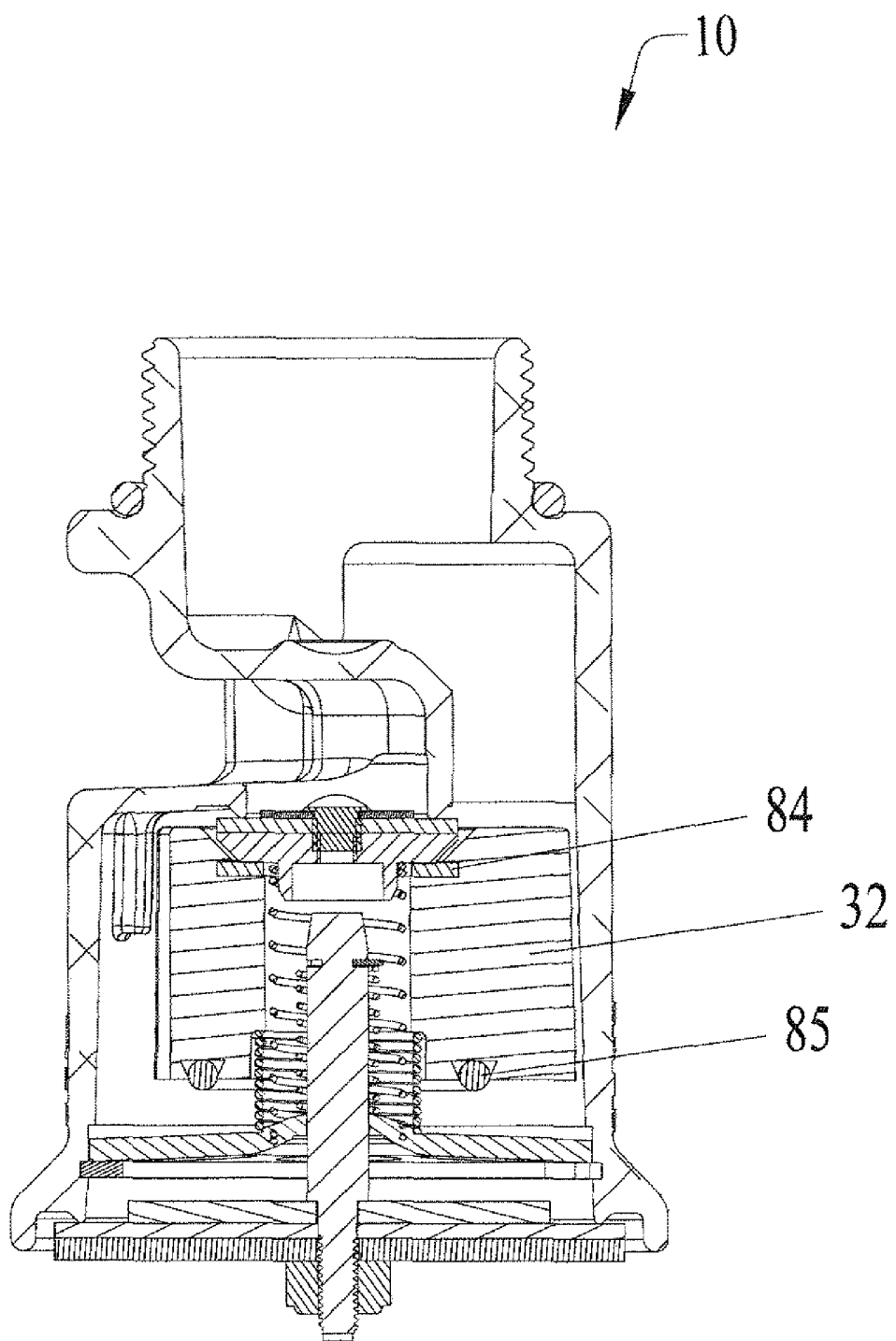

With reference to the exemplary embodiment shown in FIG. 11, one or more shock absorbers (or isolators) 84, 85 may be provided in association with block 32 in an effort to minimize the effects and transfer of vibrations and impacts upon device 10. Because block 32 is weighted, it is susceptible to being displaced from its normal resting position in close relation to sealing member 81 when device 10 or the tank experience vibrations or impact loads (such as bumps in a road). This is the reason for providing a block 32 and sealing member 81 that are separated and independent, so that sealing member 81 is not also displaced when the tank experiences vibrations or impact loads that may cause a temporary unsealing of over-pressure opening 26, which is an advantage over the prior art. Accordingly, shock absorbers 84, 85 may be positioned between block 32 and adjacent structure to at least partially absorb vibrations or loads experienced by block 32 and/or any neighboring structure, such as, for example, sealing member 81. In the embodiment shown in FIG. 11, the absorbers 84, 85 are affixed to ends of block 32. In other embodiments, one or more shock absorbers may be affixed to the surrounding structure block 32, which block 32 would otherwise be contacting if not for the presence of the shock absorbers. In essence, the absorbers are to be placed between the block 32 and other structure that block 32 may contact when vibrations or loads act upon device 10 or block 32.

Shock absorbers 84, 85 may be formed of any vibration or load absorbing or dampening material, such as, for example, nitrile or other elastomeric or viscoelastic materials, and may be affixed to either or both ends of block 32 by any known means, such as, for example, by any clip, fastener, adhesive, or simply snap fit into grooves. In the embodiment shown in FIG. 11, isolators 84, 85 are retained within corresponding grooves formed within block 32. Any quantity of vibration isolators may be used in association with either axial end of block 32, and may be annular or non-annular, continuous or segmented. Further, isolators 84, 85 may comprise any cross-sectional shape, such as, for example, rectangular (as exemplary shown by isolator 84) and circular (as exemplary shown by isolator 85).

When guide block 32 and valve sealing member 81 move to their upper position in second bore 19 as shown in FIG. 4, seal 37 contacts pressure valve seat 28 to close the pressure passageway. In the embodiment shown, the combined structure of block 32 having recess 27, valve sealing member 81, first pressure bias means 52, second pressure bias means 59, and coacting pressure valve seat 28 will be hereinafter referred to as the (one-way, normally-closed) pressure relief means or valve 82, which opens inwardly or downwardly into second bore 19 and functions to control fluid or air flow through pressure opening 26.

Figure 5:
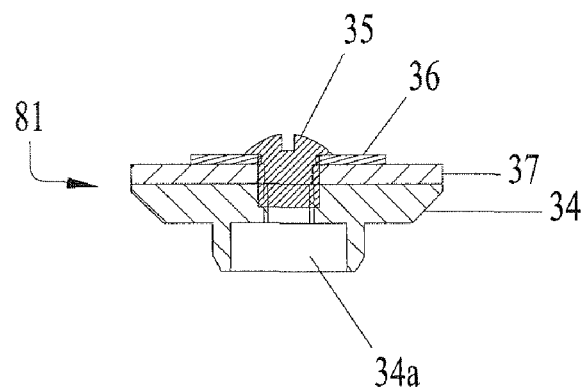
FIG. 5 is a view of the pressure disc assembly of the pressure and vacuum relief valve device of the invention.

As seen in FIGS. 2, 3, 4 and 8, positioned longitudinally, or axially, in housing second bore 19 is shaft 41. Shaft 41 may comprise an elongated rod portion 43, a circumferential groove 42, and a reduced threaded rod portion 44 extending downwardly from rod portion 43 and having a slot 45 at its bottom free end (also referred to as the shaft's second end). Slot 45 may be adapted to receive a screw driver head, or any other object, for rotating shaft 41. Shaft 41 (and the shaft's first end) may extend from an upper position of bore 50 in block 32, slidingly through centrally disposed aperture 57 in perforated vacuum relief plate 56, which therefore guides shaft 41 for limited longitudinal movement in housing second bore 19. In particular embodiments, sealing disc 34 may include a recess 34a, as shown in FIGS. 5 and 9, to accept an end of shaft 41 for provide clearance for said shaft 41.

In the embodiment shown, secured onto the reduced threaded rod portion 44 of the second (or lower) end of shaft 41 is a retainer plate 70, a sealing vacuum disc (or seal) 72, which seats against the vacuum valve seat 22, and a support plate 74, all of which are retained on shaft 41 by lock nut 76, which is threaded onto reduced threaded rod portion 44 of shaft 41. The combined structure of shaft 41, third pressure bias means 48, retainer plate 70, sealing disc 72, support plate 74 and coacting vacuum valve seat 22 will be hereinafter referred to as the (one-way, normally-closed) vacuum relief means or valve 80, which opens outwardly of bore 19 and functions to control air flow through vacuum opening 20. In other variations, sealing disc 72 may form a ring, and may be attached to support plate 74 or seat 22 for sealing engagement with plate 74 or any other sealing surface. Other means of sealing vacuum opening 20 may be provided.

Figure 8:
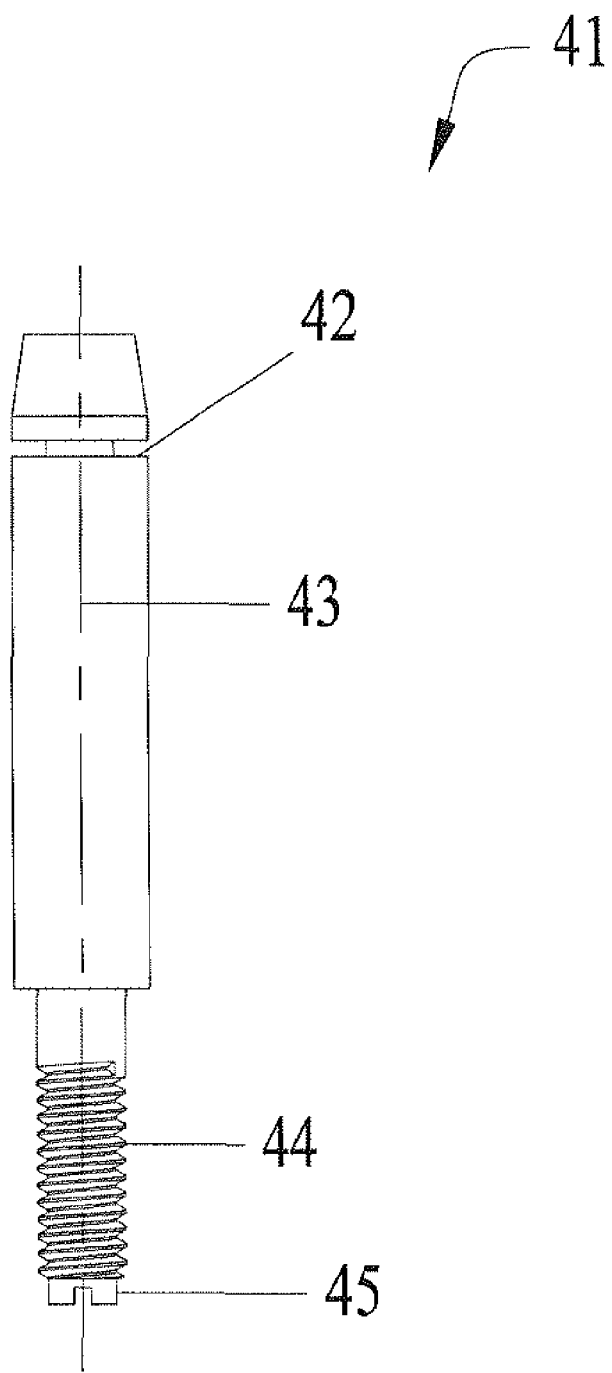
FIG. 8 of the vacuum spring shaft the pressure and vacuum relief valve device of the invention.
Figure 10:
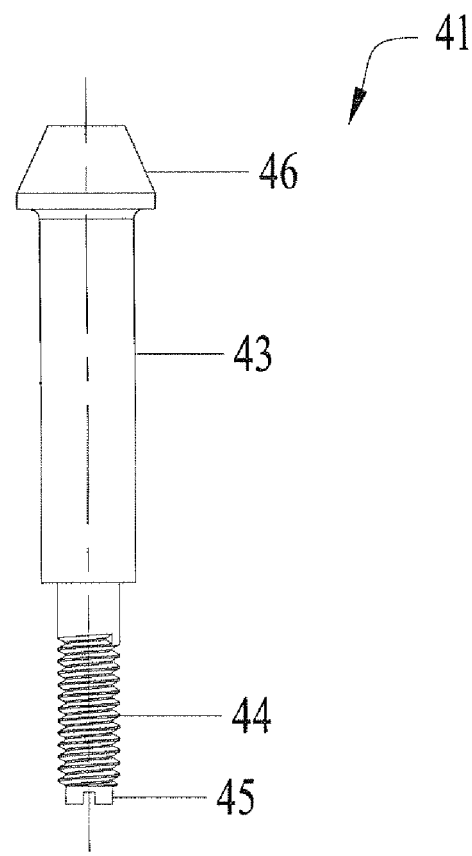
FIG. 10 is a front perspective view of another embodiment of the vacuum spring shaft the pressure and vacuum relief valve device of the invention; and, FIG. 11 is a cross-sectional view of an alternative embodiment of the pressure and vacuum relief valve device shown in FIG. 4.

With reference to the embodiments of FIGS. 4 and 8, circumferential groove 42 may receive vacuum spring retaining clip 38 for constraining, retaining, supporting, or anchoring the upper end portion of third pressure (or vacuum) bias means 48, which may comprise, for example, a coil spring, against upward movement. In an alternative embodiment, as seen in FIG. 10, head 46 with shoulder is machined onto shaft 41, thereby eliminating the need for vacuum spring retaining clip 38, but still capable of retaining the upper end portion of vacuum bias means or vacuum relief coil spring 48. Still, other means of constraining the upper end of third pressure bias means 48 known to one of ordinary skill may be employed. Third pressure bias means 48 may be inwardly concentric to a portion of first pressure bias means 52, which is at least partially inwardly concentric to second pressure bias means 59. To that end, the third pressure bias means 48, which extends between retaining clip 38 and the top surface of perforated vacuum relief plate 56 through bore 50, functions to bias vacuum relief valve 80 against vacuum valve seat 22 in a normally-closed position since valve 80 is secured to shaft 41, as seen in FIG. 4.

Figure 6:
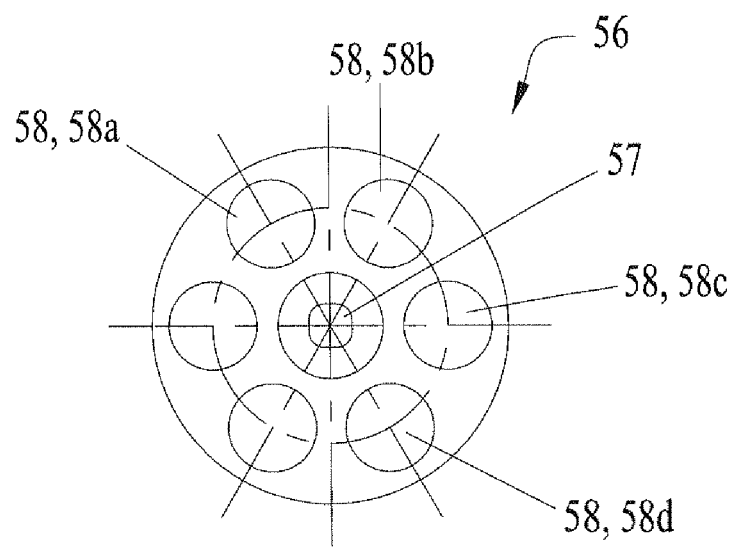
FIG. 6 is a top elevational view of the retainer plate of the pressure and vacuum relief valve device of the invention.
Figure 7:
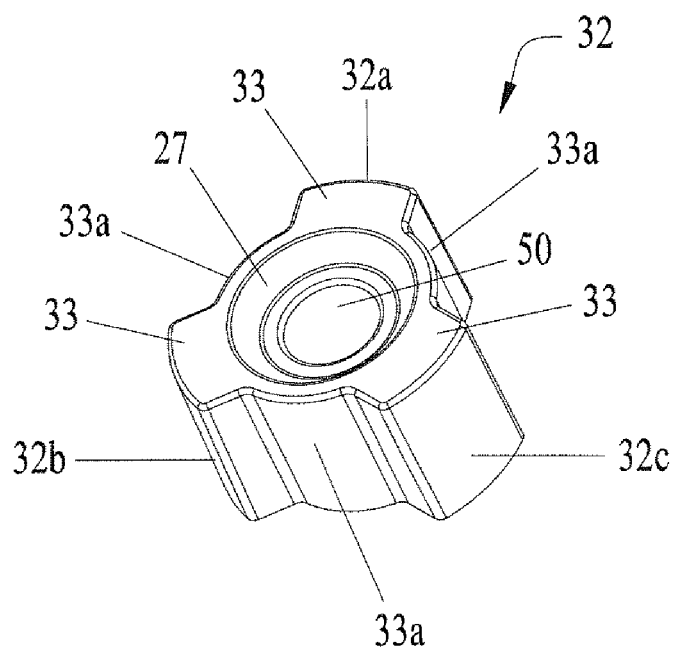
FIG. 7 is a top perspective view of the guide block of the pressure and vacuum relief valve device of the invention.

In the embodiment shown in FIGS. 2-4, the perforated vacuum relief plate 56 is held in place by spring locking retainer clip 60 that is located in an annular groove 62 formed in the wall of second bore 19, as seen in FIGS. 2-4. Thus plate 56 and retainer clip 60 form a retainer means for pressure bias members 52, 59, and 48, as described above, although other retainer means may be used as known by one of ordinary skill in the art. With reference to FIGS. 2, 3, and 6, plate 56 has a plurality of apertures 58, or apertures 58a, 58b, 58c, 58d, 58e and 58f in the embodiment shown, to permit a fluid (such as air) to flow through the plate 56. It is contemplated that any number of apertures 58 of any size or shape may be formed in plate 56 to permit fluid flow as desired. In other embodiments, apertures may be provided between the plate 56 and the inner walls of second bore 19 or housing 15.

In operation, excessive internal tank pressure is relieved by action of the pressure relief valve 82. Specifically, tank air pressure initially enters valve housing 15 through the pressure bore 26, which is part of the pressure passageway, where it forces pressure relief valve 82 to open (against the action of compressed coiled pressure relief spring 52 and block spring 59), then through the main housing bore 19 which leads to passageway 18 and out to the atmosphere exteriorly of the tank through outer end 16. During a tank tipping or roll-over, the weight of block 32 coacts with pressure bias means 52 and 59 to substantially maintain valve 82 or sealing member 81 in closed position, thereby preventing tank product leakage on such roll-over when the device 10 is inverted.

Excessive tank vacuum is relieved by vacuum relief valve 80. Specifically, atmospheric pressure flows in the sleeve bore 18 into and through housing main bore 19, then past block 32 (i.e. through the spaces between the block and the inner wall of bore 19 and/or through passages 33a), and past vacuum relief plate 56, such as through one or more apertures 58 to cause vacuum relief valve 80 to open against the force of third pressure bias means 48, and then into the tank to relieve the vacuum.

Thus, one embodiment of the invention provides tank pressure and vacuum relief valve device 10 for relieving excess pressure or vacuum in the interior of the tank including an elongated valve housing 15 having an outer end 16 secured in a coacting associated tank wall aperture in an upper wall 14 of an associated tank interiorly thereof with inner end 21 of valve housing 15 disposed in the tank interior. The valve housing 15 has a main housing longitudinal bore 19 having a vacuum opening 20 at its inner end 21 communicating with the tank interior and forming a vacuum valve seat 22 thereat. The housing 15 has passageway 18 connecting main bore 19 with the tank wall aperture 10 whereby bore 19 is in communication with the atmosphere exteriorly of the tank. The bore 19 has a pressure opening 26 at its outer end forming a pressure valve seat 28. The housing 15 has a pressure passageway that connects pressure opening 26 with the tank interior.

A normally-closed pressure relief valve 82 is operatively disposed in bore 19 and is moveable toward and away from pressure valve seat 28 for controlling air flow through pressure opening 26 and the pressure passageway. First pressure bias means 52, also called a pressure relief coil spring, is operatively disposed between the underside of the pressure disc assembly and perforated planar retainer means 56 for maintaining pressure relief valve 82 in a normally-closed position against pressure valve seat 28, and acts independently of block 32. A second pressure bias means 59, also referred to as positional relief spring or block spring, is utilized to substantially control and maintain the position of block 32. Thus, the pressure relief valve 82 may include a square or lobed block 32, which is longitudinally moveable in bore 19 independent of pressure disc assembly and first pressure bias means 52 to control air flow through pressure opening 26.

An elongated shaft 41 is positioned longitudinally in bore 19. A normally-closed vacuum relief valve 80 is disposed on shaft 41 and is selectively moveable toward and away from the vacuum valve seat 22 for controlling air flow through vacuum opening 20 and a vacuum passageway. Vacuum bias means 48, also called vacuum relief coil spring, is operatively disposed about shaft 41 for maintaining vacuum relief valve 80 in a normally-closed position against vacuum valve seat 22.

Planar retainer means 56 is disposed transversely in bore 19 and is secured to the bore wall by clip 60 for retaining the lower or inner ends of pressure bias means 52 and pressure bias means 59 in compressed position in bore 19, and vacuum bias means 48 in a resting position. The retainer means 56 also functions to guide shaft 41 for longitudinal movement in bore 19.

To disassemble the valve, the blade of a screwdriver may be inserted in slot 45 of shaft 41 (to prevent shaft 41 from rotating axially) after which lock nut 76 is unscrewed from shaft portion 44. Next, support plate 74, the sealing disc 72 and retainer plate 70 are removed from shaft 41. Next, the ends of clip 60 are pulled or pinched inwardly to remove such clip from its locked position in groove 62, after which relief plate 56 is removed from bore 19. Next, springs 52 and 59, along with spring 48, shaft 41 and block 32 are removed from bore 19 to complete disassembly. To assemble, the above steps are reversed.

Thus, the invention provides a highly effective relief valve mechanism for quickly relieving either excess pressure or vacuum from a tank interior while undergoing vibrations during operation of the trucks. Upon a tank roll-over or tipping, the added head pressure of the product will not open the valve because pressure valve 82 is urged shut by the combined forces of spring 52, block 32, and spring 59. But block 32 can withstand vibrations because it acts independently from pressure disc assembly and spring 52, and, in particular embodiments, through the addition of shock absorbers 84, 85 positioned on the top and/or bottom of block 32. These shock absorbers will serve the purpose of additional vibration dissipation.

Based upon the foregoing disclosure, it should now be apparent that the valve mechanism for quickly relieving either excess pressure or vacuum from a tank interior while undergoing vibrations during operation of the trucks as described herein will carry out the objects set forth hereinabove. It is, therefore, to be understood that any obvious variations fall within the scope of the claimed invention and thus, the selection of specific component elements can be determined without departing from the spirit of the invention herein disclosed and described.

What is claimed is:

1. A tank pressure and vacuum relief device for relieving excess pressure or vacuum pressure from an interior of a tank, the device comprising:
a housing having a first bore in communication with a second bore, the first bore extending from a first end of the housing and the second bore extending from a second end of the housing, the first end being securable to the tank for communication with an aperture in the wall, the second end being adapted for selective communication with the interior of the tank, and the housing also having an over-pressure opening in communication with the second bore opposite the second end;
a pressure relief valve for selectively relieving pressure from the tank, the pressure relief valve including a valve sealing member biased by a first pressure bias means against a pressure valve seat associated with the over-pressure opening;
a guide block translatable in an axial direction of the second bore and being biased toward the pressure valve seat by a second pressure bias means, the guide block being translatable independent of the valve sealing member; and,
a vacuum relief valve for selectively relieving vacuum pressure in the tank, the vacuum relief valve including a vacuum seal biased against a vacuum valve seat associated with the housing second end, the vacuum seal being biased by a third pressure bias means,
wherein the second pressure bias means exerts a force upon the guide block that is at least equal to the weight of the guide block.

2. The device of claim 1, wherein the first and second pressure bias means each comprise at least one spring capable of being compressed by pressure within the tank.

3. The device of claim 2, wherein a spring of the first bias means is positioned coaxially with a spring of the second biasing means.

4. The device of claim 3, wherein each of the springs engage a retainer positioned between the guide block and the second end of housing.

5. The device of claim 4, wherein a shaft extends through an opening in the retainer, the vacuum pressure seal being constrained along the shaft, and the third pressure bias means being constrained relative to the shaft to bias the vacuum valve seal against the vacuum valve seat.

6. The device of claim 1, wherein the over-pressure opening is positioned along an axial length of the housing between the first and second ends.

7. The device of claim 1, wherein a first end of the guide block includes a recess for receiving a portion of the over-pressure valve seal assembly.

8. The device of claim 1, wherein the guide block has an axial length extending between opposing ends, and at least one shock absorbing member provided in association with at least one of the ends.

9. The device of claim 8, wherein the at least one shock absorber forms an annular ring affixed to at least one of the ends.

10. The device of claim 8, wherein the at least one shock absorber is formed of a vibration dampening material.

11. The device of claim 1, wherein the guide block is capable of independently translating relative to the pressure valve seat while the valve sealing member remains in sealing engagement with the pressure valve seat.

12. The device of claim 1, wherein one or more fluid passages extend through the second bore between opposing axial ends of the guide block.

13. The device of claim 1, wherein the first pressure bias means includes a compressed coiled spring compressed between the valve sealing member and a retainer positioned between the guide block and the second end, and the second pressure bias means includes a compressed coiled spring extending between the guide block and the retainer.

14. The device of claim 1, wherein the sum of the force exerted upon the guide block by the second bias means, the weight of the guide block, the weight of the valve sealing member, and the force exerted upon the valve sealing member by the first pressure bias means is at least substantially equal to an opposing force exerted by a head pressure created by a fluid within a tank upon the valve sealing member when the tank is tipped.

15. The device of claim 1, wherein the first end of the housing is affixed to an aperture of the tank, the housing extending substantially within an internal chamber of the tank.

16. A tank pressure and vacuum relief device for relieving excess pressure or vacuum pressure from a tank interior, the device comprising:
a housing having a first bore in communication with a second bore, the first bore extending from a first end of the housing and the second bore extending from a second end of the housing, the first end being securable to a tank wall for communication with an aperture in the wall, the second end being adapted for selective communication with the tank interior, and the housing also having an over-pressure opening in communication with the second bore opposite the second end;

a pressure relief valve for selectively relieving pressure from a tank, the pressure relief valve including a valve sealing member biased by a first pressure bias means against a pressure valve seat associated with the over-pressure opening;

a guide block translatable in an axial direction of the second bore and being biased toward the pressure valve seat by a second pressure bias means, the guide block being translatable independent of the valve sealing member; and, a vacuum relief valve for selectively relieving vacuum pressure in the tank, the vacuum relief valve including a vacuum seal biased against a vacuum valve seat associated with the housing second end, the vacuum seal being biased by a third pressure bias means, wherein the first and second pressure bias means each comprise at least one spring capable of being compressed by pressure within the tank, wherein each of the springs extend within a bore of the guide block.

17. The device of claim 16, wherein the second pressure bias means exerts a force upon the guide block that is at least equal to the weight of the guide block.

18. A tank pressure and vacuum relief device for relieving excess pressure or vacuum pressure from a tank interior, the device comprising:

a housing having a first bore in communication with a second bore, the first bore extending from a first end of the housing and the second bore extending from a second end of the housing, the first end being securable to the tank wall for communication with an aperture in the wall, the second end being adapted for selective communication with the interior of the thank, and the housing also having an over-pressure opening in communication with the second bore opposite the second end;

a pressure relief valve for selectively relieving pressure from the tank, the pressure relief valve including a valve sealing member biased by a first pressure bias means against a pressure valve seat associated with the over-pressure opening;

a guide block translatable in an axial direction of the second bore and being biased toward the pressure valve seat by a second pressure bias means, the guide block being translatable independent of the valve sealing member; and, a vacuum relief valve for selectively relieving vacuum pressure in the tank, the vacuum relief valve including a vacuum seal biased against a vacuum valve seat associated with the housing second end, the vacuum seal being biased by a third pressure bias means, wherein said valve sealing member includes an over-molded pressure disk having a seal molded about the disk, the seal on the over-molded pressure disk being adapted to sealingly engage the pressure valve seat.

19. A method for selectively relieving excess pressure or vacuum pressure from a tank, the method comprising the steps of:

providing a tank pressure and vacuum relief device, the device including:

a valve housing having a first bore extending from a first end of the housing and a second bore extending from a second end of the housing, the first bore being in communication with the second bore and being securable to a tank wall for communication with an aperture in the wall, the second end being adapted for selective communication with the tank interior, and the housing also having an over-pressure opening in communication with the second bore opposite the second end;

a pressure relief valve including a valve sealing member biased against a pressure valve seat associated with the over-pressure opening by a first pressure bias means, the valve sealing member being capable of sealing the over-pressure opening;

a guide block translatable in an axial direction of the second bore and being biased toward the pressure valve seat by a second pressure bias means and capable of applying pressure to the valve sealing member; and, a vacuum relief valve for selectively relieving vacuum pressure in the tank, the vacuum relief valve including a vacuum seal biased against a vacuum valve seat associated with the housing second end, the vacuum seal being biased by a third pressure bias means;

placing the device within a tank and affixing the first end of the housing to an aperture in a wall of the tank;

relieving excess pressure within the tank acting against the pressure relief valve by compressing the first and second valve bias means to release the valve sealing member from engagement with the pressure valve seat associated with the over-pressure opening in said housing, the excess pressure flowing into the housing through the over-pressure opening and through the second bore to the first bore of the housing to the first end, where said excess pressure is expelled from housing through the first end opening.

20. The method of claim 19, wherein the first and second pressure bias means each comprise at least one spring capable of being compressed by pressure within the tank.

21. The method of claim 19, wherein the guide block has an axial length extending between opposing ends, and at least one shock absorbing member provided in association with at least one of the ends.

* * * * *